United States Patent [19]

Suzuki et al.

[11] Patent Number: 4,514,451
[45] Date of Patent: Apr. 30, 1985

[54] POLYESTER SUBSTRATE FOR MAGNETIC RECORDING MEDIUM HAVING OLIGOMER PROTRUSIONS THEREON

[75] Inventors: Takashi Suzuki, Takatsuki; Koichi Shinohara, Kobe; Masaru Odagiri, Kawanishi; Takashi Fujita, Kawanishi; Shigeki Kawase, Takarazuka, all of Japan

[73] Assignee: Matsushita Electric Industrial Co., Ltd., Kadoma, Japan

[21] Appl. No.: 514,607

[22] Filed: Jul. 18, 1983

[30] Foreign Application Priority Data

Jul. 22, 1982 [JP] Japan ................. 57-128784

[51] Int. Cl.$^3$ .................. B32B 3/00; G11B 5/70
[52] U.S. Cl. ...................... 428/141; 428/147; 428/152; 428/216; 428/218; 428/409; 428/458; 428/694; 428/695; 428/900
[58] Field of Search ............ 428/692, 694, 695, 693, 428/147, 152, 213, 218, 409, 425.9, 458, 693, 900, 141, 215, 216

[56] References Cited

U.S. PATENT DOCUMENTS

| | | | |
|---|---|---|---|
| 4,233,352 | 11/1980 | Ono et al. | 428/141 |
| 4,320,207 | 3/1982 | Watanabe et al. | 525/176 |
| 4,348,446 | 9/1982 | Mitsuishi et al. | 428/694 |
| 4,439,479 | 3/1984 | Kanai et al. | 428/694 |

FOREIGN PATENT DOCUMENTS 2087302  5/1982  United Kingdom .

Primary Examiner—Marion E. McCamish
Assistant Examiner—William M. Atkinson
Attorney, Agent, or Firm—Cushman, Darby & Cushman

[57] ABSTRACT

A magnetic recording media comprises a polyester substrate having 1000/mm$^2$ or more protrusions of polyester oligomer, and a ferromagnetic thin film of 400 Å or larger thickness both formed on the surface of the polyester substrate; the recording media has substantially no squealing even at 30° C. at over 80% relative humidity.

9 Claims, 1 Drawing Figure

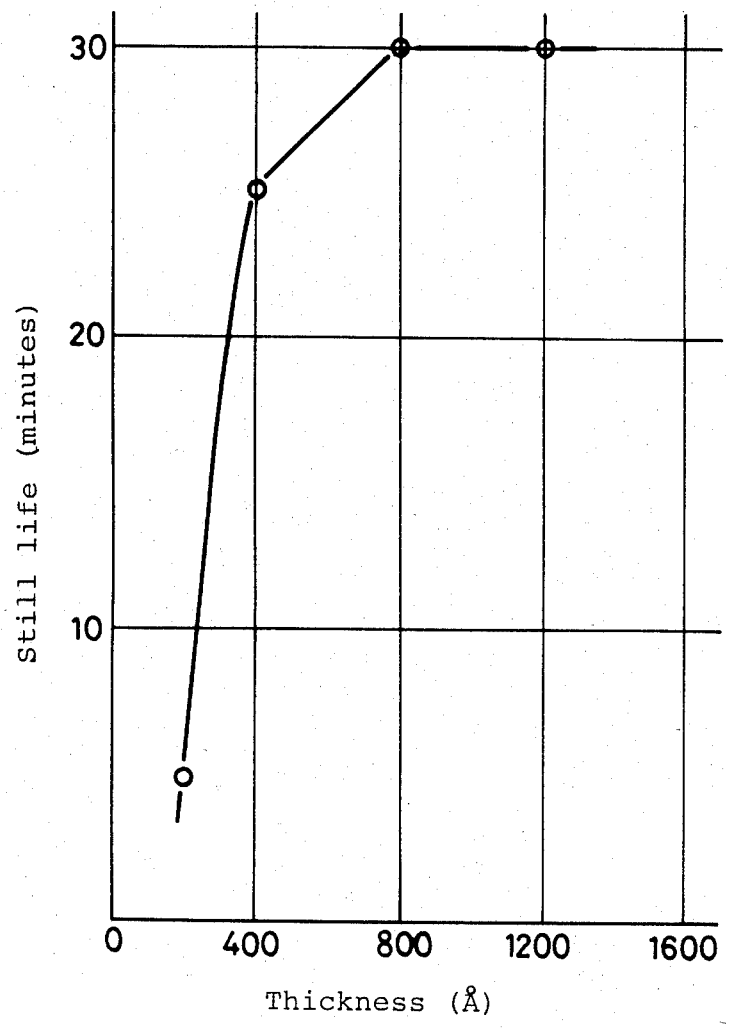

POLYESTER SUBSTRATE FOR MAGNETIC RECORDING MEDIUM HAVING OLIGOMER PROTRUSIONS THEREON

BACKGROUND OF THE INVENTION

The present invention relates to an improvement in magnetic recording medium, specially suitable for metal thin film type magnetic recording medium for video tape recording. Ferromagnetic thin film type magnetic recording medium is typically manufactured by forming on a polyester film ferromagnetic thin film such as Fe, Co, Ni or their alloys, by means of vacuum deposition, ion plating, spattering, electrolytic plating, etc. is advantageous in that its recording density can be drastically increased in comparison with the conventional coating of a magnetic film type recording medium. Such magnetic recording medium must have good surface characteristic suitable for the recording. Since the ferromagnetic thin film is quite thin, i.e. having a small thickness of 100 Å–3000 Å, the surface characteristic of it reflects those characteristics of the substrate plastic film. On the other hand, it has been found that a magnetic recording medium to be used in high density recording should have a substrate surface having a slight roughness (peak to valley-bottom level difference) of protrusions and indeed a high density distribution of minute unevenness is considered good. As a substrate or film base suitable for the above-mentioned conditions, plastic substrates have been made by forming extremely minute protrusions induced by residue of the catalyst used for polyester polymerization on the surfaces, or by forming a wave-shaped or granular pattern on the surface of the polyester film by forming a cross-linked high molecular weight thin film mainly consisting of denatured silicone resin, epoxy resin or urethane on the surface of the polyester film during a stretching process. Magnetic recording media made by forming a ferromagnetic thin film on the above-mentioned films have advantage that they have a satisfactory still life when encountering friction with video recorder magnetic heads, but the conventional magnetic recording media with a ferromagnetic thin film have the shortcoming that when they are used below 30° C. and at 80%–90% relative humidity (hereinafter referred to as RH) i.e., high moisture conditions, they are liable to make a squealing upon running around a head cylinder part.

The present invention provides a magnetic recording medium having good surface characteristics that is not liable to produce such objectionable squealing.

Ordinary polyester film available in the market includes a low molecular weight polymerized composition which is produced as a by-product during polymerization of the polyester resin, i.e., an oligomer, at a rate of about 1%. In general, a polyester film has a smaller distribution of the oligomer component at its surface because in a heat-set treatment in the final process of making the film, the oligomer on the surface appears to have sublimated from the surfaces, thereby making the surfaces very smooth after the heat set treatment. When such a polyester film with a very smoothly finished surface is exposed to a high temperature, oligomers inside the film diffuse out to the surface forming minute crystal-type depositions on the polyester film surfaces. That is, ordinary polyester film available in the market hardly has any oligomer protrusions of noticeable size which the present invention utilizes to advantage. However, the polyester film is subjected to heat or radiated energies from metal vapor, ion vapor, or a vaporizing source during the processing of forming ferromagnetic thin film by vacuum deposition, ion plating, spattering, etc. for forming the ferromagnetic thin film on the polyester film. As a consequence oligomer protrusions are formed on the surface of the polyester film during the process of forming the ferromagnetic thin film thereon. As a result, the polyester film base when coated with a ferromagnetic thin film is provided with oligomer protrusions beneath the ferromagnetic film. When ordinary polyester film available in the market is used as the substrate, the density of the oligomer protrusions on the substrate surface is only about 100/mm$^2$ or smaller.

SUMMARY OF THE INVENTION

The present inventors have found that magnetic recording media with a ferromagnetic thin film formed on a polyester film base, which film base has oligomer protrusions on the surface of the polyester film and under the ferromagnetic thin film a distinctly larger number per unit of square surface area, have satisfactory characteristics such that substantially no squealing occurs even at severe conditions of temperatures as high as 30° C. and at 80%–90% RH.

The purpose of the present invention is to provide a magnetic recording medium having satisfactory characteristics of substantially no squealing even under severe operating conditions.

According to the present invention, a magnetic recording medium which has satisfactory characteristics of substantially no squealing, and long still life is obtainable.

BRIEF DESCRIPTION OF THE DRAWING

The attached drawing is a graph showing the relationship between the thickness of the ferromagnetic thin film and the still life of a magnetic recording medium of a magnetic recording medium made in accordance with the present invention.

DESCRIPTION OF THE PREFERRED EMBODIMENTS

The inventors found that magnetic recording media with a ferromagnetic thin film formed on a polyester film, which film has at least a minimum predetermined number of oligomer protrusions on the surface of the polyester film per square surface area and beneath the ferromagnetic thin film, have satisfactory characteristics of substantially no liability of squealing even at such severe conditions of 30° C. and 80%–90% RH.

More specifically, the inventors have found that the magnetic recording media of the present invention have good squeal-free characteristics, when the number of the oligomer protrusions on the surface of the polyester substrate and beneath the ferromagnetic thin film is of a density of 1000/mm$^2$ or larger. The magnetic recording medium in accordance with the present invention must include, in addition to the polyester film substrate having oligomer protrusions on its principal face of a density of 1000/mm$^2$ or higher, a ferromagnetic thin film coating thereon having a thickness of 400 Å or larger thickness on the principal face.

As the polyester film to be used as the starting material for the film substrate or base for this invention, the following films are appropriate: A film having as its major component polyethylene terephthalate as single substance; a crystalline copolymer and mixed polymer consisting mainly of polyethylene terephthalate, polyethylene-2,6-naphthalate as a single substance; a crystalline copolymer and mixed polymer consisting mainly of polyethylene-2,6-naphthalate, or the like, and which films are made through stretch film-forming process, wherein:

(1) the size of the solid state fine grains induced by the residue of the polymerization catalyst is controlled so that only extremely fine grains, e.g. grains 50–1000 Å in size, are retained,
(2) besides the aforementioned size-controlled solid state grains, at least one other kind of minute grains, e.g. 300–1000 Å in size, are also distributed,
(3) on a polyester film having a very evenly finished surface where the existence of grains induced by the residue of the polymerization catalyst is strictly limited, a thin film principally consisting of cross-linked high molecular resin and having a wave-shaped or grain-shaped pattern surface is coated,
(4) on the polyester film finished very evenly having the surface as aforementioned (1), a thin film of a crystalline high polymer substance having wrinkle-shaped protrusions are formed.

The surface of the above-mentioned polyester film substrates (1) through (4) should have a surface roughness Rmax of 1000 Å, preferably 500 Å or lower. The surface roughness can be measured by using high accuracy contact tip type roughness meter (Talystep-1, Taylor-Hobson Co., Ltd.). The measured roughness is represented by a value which is level difference from the peak of a protrusion to the bottom of the adjacent valley of the surface in a manner as defined by ISO R468-1966 or JIS B0601 Standard.

The desired protrusions consisting of polyester oligomers can be obtained by method such as when the polyester film surface is preliminarily heat-treated to separate the polyester oligomer on the surface and thereafter the ferromagnetic thin film is formed on the substrate. Alternatively, in a vacuum deposition process in a vacuum chamber, in the initial stage of treatment the polyester film surface is strongly heated to separate the oligomer protrusions and thereafter, in sequence, vacuum deposition is made on the substrate to form the ferromagnetic thin film on the oligomer protrusion-containing surface.

By observing the surface of the ferromagnetic thin film by means of a scanning-type electron microscope, the existence of the oligomer-separated protrusions under the ferromagnetic thin film can be easily distinguished from other protrusions. The oligomer protrusions are originally a polygonal shaped crystal formed at the surface of the polyester film, but they are actually distorted by means of heat when the ferromagnetic thin film is vapor deposited into rather round and moderate shaped protrusions by removal of the corner parts. Furthermore, by comparing a surface of a polyester film, on which thin aluminum film or thin gold film is formed under controlled conditions in order to suppress heating of the polyester film surface, with another polyester film surface having oligomer protrusions and further thereon a ferromagnetic thin film, the distinguishing oligomer protrusions of the present invention are easily observed. The above-mentioned oligomer protrusions can be easily observed with a differential interference-type optical microscope having a magnifying power of about 400.

For a given area the density of the oligomer protrusions on the film surface is 1000/mm² or more, preferably 2500/mm² or more. Such oligomer protrusion densities can be determined by observing them through the differential interference-type optical microscope of a magnifying power of about 400, and observing at least 10 microscopic fields and counting the number of oligomer protrusions in the fields, followed by subsequent calculation of the average value of the density of oligomer protrusions per 1/mm². The oligomer protrusions may be distributed in the microscopic field of the 400 power microscope in a relatively uniform manner or they may be distributed in a block style distribution. The block may have several to several tens of oligomer protrusions. Or if in chain-like or short-fiber-like block distribution, the chain- or short-fiber-like block may have several to several tens of oligomer protrusions. Whatever the configuration of the distribution, it is desirable that the oligomer distribution on the polyester film surface should be substantially even from a microscopic view point.

The heights of the oligomer protrusions according to the present invention should be 100 Å–2000 Å measured from a center line of the surface roughness curve of the ferromagnetic thin film (defined by the above-mentioned ISO R468-1966 or JIS B0601 Standard), and preferably is 150 Å–1000 Å of the same standard. When the heights are less than 100 Å, prevention of squealing during high humidity operation is insufficient, and for heights in excess of 2000 Å, space loss between the magnetic head and the magnetic recording medium becomes too large thus spoiling magnetic characteristics of the recording or reproduction.

Lateral spread of the oligomer protrusions should be less than 1 μm, and preferably less than 0.5 μm. For lateral spreads over 1 μm, the squealing prevention is unsatisfactory.

The surface shape of the ferromagnetic thin film assumes the surface shape of the underlying polyester film base which includes the oligomer protrusions on its surface, and accordingly contact between the ferromagnetic thin film surface and the magnetic recording head is carried out with those portions of the ferromagnetic thin film surface above the highest protrusions. In accordance with this invention, the highest protrusions are preferably made by the polyester oligomers. In an actual preferred embodiment, at least ⅔ or more, preferably 9/10 or more, of the highest peaks are preferably based on the polyester oligomers.

Among the four kinds of polyester films (1), (2), (3) and (4) described above, polyester films of (3) and (4) are provided with an interface thin film layer of a material different from the polyester substrate between the polyester substrate film and the ferromagnetic thin film. These 3-layer films are especially suitable for the present invention for the following reason: for polyester film types (3) and (4), an interface thin film, which is of different substance from that of the polyester substrate, is formed on the principal surface of the polyester film leaving the polyester oligomers present on the film base to protrude through small pin-hole parts of the interface thin film. These pin-holes are necessarily distributed on the interface thin film since it is very thin. When the interface thin film is of a substantially uniform thickness, the small pin-holes distribute very evenly, and therefore the oligomer protrusions are distributed evenly. Since the growth of the oligomer protrusions are controlled by the pin-holes of the interface thin film, the sizes of the oligomer protrusions are evenly controlled by means of the interface thin film. Even when the interface thin film is formed, the oligomer protrusions have their roots in the polyester film. Therefore, the oligomer protrusions are strongly fixed to and a part of the polyester substrate film itself. These interface thin films are provided by coating a solution containing deposited polyester oligomers onto a film other than polyester, for instance a plastic film substrate such as an aromatic polyamide film, then after forming the polyester oligomer protrusions on the composite film a ferromagnetic thin film is formed thereon. In such a magnetic recording film the oligomer protrusions are likely to be easily dropped off.

Since the polyester oligomers have a lower softening temperature than that of polyester substrate, the oligomer protrusions are likely to be softened by heat caused by friction when the magnetic recording medium is wrapped around a recording head during use. Accordingly, the friction-resistivity of the ferromagnetic thin film at those parts extending above the oligomer protrusions is weaker than other parts of the magnetic recording medium. This is presumed to be the reason that the still life of the magnetic recording medium cannot be sufficiently extended. Especially when the ferromagnetic thin film is less than 400 Å in thickness, the still life of the magnetic recording tape becomes extremely short, and therefore the ferromagnetic thin film must be at least 400 Å thick.

In order to further improve the still life of the magnetic recording medium, it is preferable to provide an interface or undercoating thin film between the polyester base and the ferromagnetic thick film, which interface coating provides mechanical reinforcing or bonding force increasing effect, suitable undercoatings or interface films are metal thin films of Ti, Cr or Ni or a thin oxide film such as $Al_2O_3$, $SiO_3$ etc., which film is formed by a vacuum deposition process or by a spattering process on the polyester substrate film base having oligomer protrusions thereon prior to forming of the ferromagnetic thin film. The thickness of such mechanical enforcing thin films is preferably 200 Å–1000 Å. In view of the bonding strength of the above-mentioned reinforcing metal thin film to the polyester substrate film surface, it is preferable that by adopting an oxygen-dominant atmosphere during the vacuum vapor deposition process or spattering process to form it, some small amount of oxygen is included in the reinforcing metal thin film.

In forming the ferromagnetic thin film, for instance, oblique vapor deposition or vertical vapor deposition of a metal thin film of Co, Ni, Fe, etc., or a thin metal film containing these metals as a host material, for instance, Co-Cr vertical magnetization film, can be used. In general, however, in order to improve the bonding strength of the above-mentioned reinforcing magnetic thin film to the polyester film base, or to further improve the corrosion-resistivity and abrasion-resistivity of the ferromagnetic thin film itself, it is preferable to use an oxygen-dominant atmosphere during the vapor deposition of the ferromagnetic thin film layer, thereby producing a ferromagnetic thin film containing some oxygen in it. Preferable contents of the oxygen in either the ferromagnetic thin film or the reinforcing non-magnetic metal thin film should be at least 3% and preferably 5% or more.

The presence of oxygen in the ferromagnetic thin film, or in the ferromagnetic thin film combined with the undercoating reinforcing metal thin film which also contains oxygen, or by further combination with the oligomer protrusions having their roots in the polyester film substrate, drastically improves the still life of the magnetic recording medium.

By forming a lubricant layer on the surface of the top or outer surface ferromagnetic thin film, improved tape running characteristics are further attainable, and this prevents scaling of the ferromagnetic thin film in hot temperatures and in high moisture conditions. The lubricant layer can be formed by simply depositing one or more of the following organic or inorganic lubricants on the ferromagnetic thin film surface. Alternatively, the lubricant can be applied in a form of thin resin coating formed by applying a solution containing the lubricant substance and a plastic resin. In this manner, the lubrication characteristics of the ferromagnetic thin film are further improved.

As an organic lubricant, fatty acids, fatty acid esters, fatty acid amides, metallic soaps, aliphatic alcohols, paraffins, silicones, fluorine-surfactants, or the like are suitable.

Fatty acids include those having 12 or more carbons, such as lauric acid, myristic acid, palmitic acid, stearic acid, behenic acid, oleic acid, linolic acid and linolenic acid. As the fatty acid esters, stearic acid ethyl ester, stearic acid butyl ester, stearic acid amyl ester, stearic acid monoglyceride, palmitic acid monoglyceride, oleic acid monoglyceride, pentaerythritol-tetrastearate, etc., can be used.

As the fatty acid amide, caproic acid amide, capric acid amide, lauric acid amide, palmitic acid amide, stearic acid amide, behenic acid amide, oleic acid amide, linolic acid amide, methylene bis-stearic acid amide and ethylene bis-stearic acid amide, etc., can be used.

As the metal soap, salts of lauric acid, myristic acid, palmitic acid, stearic acid, behenic acid, oleic acid, linolic acid, linolenic acid with zinc, lead, nickel, cobalt, iron, aluminum, magnesium, strontium or copper, metals, etc. and salts of alkyl sulfonates derived from acids of lauryl, palmitil, myristil, stearyl-behenyl, oleyl, linol, linolen, etc. with the above-mentioned metals can be used.

As the aliphatic alcohols, cetyl alcohol and stearil alcohols can be used. As the paraffin, saturated hydrocarbons such as n-octadecane, n-nonadecane, n-tridecane, n-docosane, n-dotriacontane, etc., can be used. As the silicone, a polysiroxane having its hydrogens partly substituted by an alkyl group or phenyl group, and those further denatured by fatty acid, aliphatic alcohols, acid amide or the like can be used. As the flourine surfactant, salts of perfluoroalkyl carboxylic acid or perfluoroalkyl sulfonic acid and sodium, potassium, magnesium, zinc, aluminium, iron, cobalt or nickel, and perfluoroalkyl phosphate ester, perfluoroalkyl betaine, perfluoroalkyltrimethyl ammonium salt, perfluoroethylene oxide, perfluoroalkyl fatty acid ester, etc. can be used.

As the inorganic lubricant, graphite powder, molybdenum disulfide powder, wolfrum disulfide powder, molybdenum selenide powder, wolfrum selenide powder, calcium fluoride powder or the like can be used.

The lubricant layer is formed by applying the above-mentioned lubricant as such, or dissolving the lubricant and a synthetic resin in a solution or by depositing the lubricant from a vapor thereof on the ferromagnetic thin film surface. In case of the above-mentioned application of the solution, polyester resins, epoxy resins, urethane resins, are suitable as binders for the lubricant solution. An anti-static agent, antirust agent, or the like additives can be used. In any case, the amount of the lubricant layer to be coated on the ferromagnetic thin film should be at a rate of 0.5–500 mg/m², preferably 5–200 mg/m². The lubricant need not cover the entire surface of the magnetic recording medium, but may be formed partly, for instance, in a checkered-shaped pattern or an oblique stripe-shaped or dot-shaped pattern.

An actual example of the present invention is elucidated in the following:

EXAMPLE 1

As a polyester substrate film, a polyethylene terephthalate is used having substantially no fine grains based on the polymerization catalyst residue on the surfaces, hence having an even-finished surface. Then, on one surface of the substrate, an interface thin film having very fine, wave-formed unevenness and made of a high polymer plastic of a type different from the polyester film base is formed. The interface film is formed by coating a solution of a denatured silicone emulsion solution containing a viscosity-increasing agent during the stretching process of the polyester film, followed by hardening the interface film's surface, thereby providing a very fine waveformed unevenness of about a 150 Å surface roughness.

As another sample, the opposite surface of the same type polyester substrate, which is the even-finished surface of the polyester film, is used without forming the interface thin film. Several samples of these two kinds of film surfaces are prepared. Then hot air streams are blown continuously onto the surfaces of these two types of samples with various temperatures between 170° C.–180° C. for various times. Then polyester oligomer minute crystals are separated on the even-finished principal surface sample and, in case of the interface thin film coated samples, through the weak point or cracks of the interface thin film. And thereafter, on the surfaces of these samples, Co and Ni are vacuum-deposited by a continuous oblique vacuum-deposition to form ferromagnetic thin films containing 20 wt % of Ni and having a thickness of 1000 Å, in an atmosphere containing a small amount of oxygen, thereby forming a ferromagnetic thin film containing 5% oxygen as calculated on the number of atoms of metal.

Comparative samples are made using a polyester film having no oligomer protrusions deposited thereon and another sample where oxygen gas was not used during the vacuum deposition process. The resulting oxygen content was less than 1% as calculated on the amount of metal atoms. Still another polyester film having an interface layer of a $TiO_2$ spattered film 300 Å in thickness under the ferromagnetic thin film is prepared.

These samples are cut into predetermined widths to make sample tapes which were tested to determine their squealing characteristics and still lives as video recorder tapes using an ordinary home use video tape-recorder under the conditions of 30° C. at 80% RH and 30° C. at 90% RH. The results of the examination are shown in the following Table 1 wherein the samples No. 1, No. 5 and No. 9 are data of the comparison samples.

TABLE 1

| Sample No. | Condition of the polyester film surface under the ferromagnetic thin film | Oligomer protrusions Density (Oligomer protrusion/mm²) | Height (Å) | Lateral Spreads (Å) | Oxygen contents in ferromagnetic thin layer (atom %) | $TiO_2$ Interface layer | Squealing 30° C. 80% | Squealing 30° C. 90% | Still life (minutes) 30° C. 80% | Still life (minutes) 30° C. 90% |
|---|---|---|---|---|---|---|---|---|---|---|
| *1 | Even surface | 100 | 100 | 500 | 1 or less | nil | harsh | — | 15 | — |
| 2 | " | 1,000 | 500 | 4,000 | 5 | " | silent | fairly silent | 30 | 10 |
| 3 | " | 2,500 | 400 | 3,000 | 5 | formed | " | silent | 60 | 20 |
| 4 | " | 1,500 | 500 | 5,000 | 1 or less | nil | " | fairly silent | 20 | 5 |
| *5 | " | 2,000 | 70 | 300 | 5 | " | harsh | — | 30 | — |
| 6 | " | 3,000 | 200 | 800 | 5 | " | silent | fairly silent | 60 | 20 |
| 7 | " | 4,000 | 300 | 1,000 | 5 | " | extremely silent | silent | 80 | 40 |
| 8 | " | 7,000 | 400 | 2,000 | 5 | formed | extremely silent | " | 80 | 50 |
| *9 | " | 300 | 80 | 1,000 | 5 | " | harsh | — | 20 | — |
| *10 | " | 1,500 | 1,000 | 12,000 | 5 | nil | fairly harsh | harsh | 20 | 5 |
| *11 | " | 700 | 150 | 1,000 | 5 | nil | fairly harsh | fairly harsh | 15 | 5 |

(*marked are comparison samples which are outside of the present invention)

EXAMPLE 2

On each of the surfaces of the ferromagnetic thin films of the samples No. 3, No. 4, No. 7 and No. 8 of the preceding Example 1, a solution of stearic acid (500 ppm concentration) in acetone is coated with wet-thickness of about 5 μm and dried, to form a lubricant layer. In all the samples thus prepared squealing under conditions of 30° C. and 90% RH are almost prevented and the tape runs with satisfactory conditions.

EXAMPLE 3

On one surface of a polyethylene terephthalate film in which fine grains based on the polymerization catalyst residue are extremely reduced in a manner similar to the samples of the foregoing Example 1, ferromagnetic Co-Ni thin films of different film thicknesses, i.e. of 200 Å, 400 Å, 800 Å and 1200 Å, are respectively formed. The relationship between the still lives and the thickness of the ferromagnetic thin film are examined and the results are shown in the attached Figure. In all the above-mentioned samples, the states of the oligomer protrusion formation are similar to each other and the density is about 2500/mm², heights are about 500 Å and diameters are about 3000 Å.

As is apparent from the above-mentioned examples, the magnetic recording medium in accordance with the present invention has very much improved running characteristics and its still life and its utility are considerable.

What is claimed is:

1. A magnetic recording medium comprising:

a polyester substrate having oligomer protrusions at least on its principal face, said protrusions present at a density of 1000/mm² or higher, and a ferromagnetic thin film having a thickness of 400 Å or larger formed on said principal face, wherein the heights of said oligomer protrusions are 100Å–2000 Å and the lateral spread of said oligomer protrusions is 1 μm or smaller.

2. A magnetic recording medium in accordance with claim 1, wherein the heights of said oligomer protrusions are 150Å–1000 Å and the lateral spread of said oligomer protrusions is 0.5 μm or smaller.

3. A magnetic recording medium in accordance with claim 1, wherein said ferromagnetic thin film comprises predominantly a ferromagnetic metal containing oxygen.

4. A magnetic recording medium in accordance with claim 1 which further comprises a lubrication layer on the surface of said ferromagnetic thin film.

5. A magnetic recording medium in accordance with claim 1 which further comprises an interface thin film between said polyester substrate and ferromagnetic thin film.

6. A magnetic recording medium in accordance with claim 5, wherein said interface thin film is of a substance selected from the group consisting of Ti, Cr, Ni, $Al_2O_3$ and $SiO_2$.

7. A magnetic recording medium in accordance with claim 5, wherein said interface thin layer is in the form of a wave or granular shaped pattern.

8. A magnetic recording medium in accordance with claim 5, wherein said interface thin film layer has a wrinkled surface.

9. A magnetic recording medium comprising:

a polyester substrate having oligomer protrusions at least on its principal face, said protrusions present at a density of 2500/mm² or higher, and a ferromagnetic thin film having a thickness of 400 Å or larger formed on said principal face, wherein the heights of said oligomer protrusions are 150 Å–1000 Å and the lateral spread of said oligomer protrusions is 1 μm or smaller.

* * * * *